(12) United States Patent
Bischoff

(10) Patent No.: US 6,331,142 B1
(45) Date of Patent: Dec. 18, 2001

(54) STRAW CHOPPER FOR A COMBINE

(75) Inventor: Lutz Bischoff, Dellfeld (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/401,553

(22) Filed: Sep. 22, 1999

(30) Foreign Application Priority Data

Feb. 16, 1999 (DE) .............................................. 199 06 454

(51) Int. Cl.$^7$ .................................................. A01F 12/40
(52) U.S. Cl. ........................................... 460/112; 460/901
(58) Field of Search ...................................... 460/111, 112, 460/901, 44, 63, 66, 71, 78; 241/243

(56) References Cited

U.S. PATENT DOCUMENTS

| 2,213,906 | * | 9/1940 | Ebersol ................... 460/112 |
| 2,708,582 | | 5/1955 | Adams . |
| 3,005,637 | * | 10/1961 | Hetteen ................... 460/112 |
| 3,186,460 | * | 6/1965 | Frederick ................. 460/111 |
| 3,350,017 | | 10/1967 | Howell et al. . |
| 3,587,690 | * | 6/1971 | Peak ....................... 460/112 |
| 4,637,406 | * | 1/1987 | Guinn et al. .............. 460/111 |
| 4,646,757 | * | 3/1987 | Schmitt et al. ............ 460/112 |
| 4,669,489 | * | 6/1987 | Schraeder et al. .......... 460/112 |
| 4,735,216 | * | 4/1988 | Scott et al. ............... 460/111 |
| 4,913,679 | * | 4/1990 | Bender ..................... 460/112 |
| 5,021,028 | * | 6/1991 | Kersting et al. ............ 460/85 |
| 5,120,275 | * | 6/1992 | Zacharias .................. 460/111 |
| 5,501,635 | * | 3/1996 | Niermann .................. 460/112 |
| 5,542,883 | * | 8/1996 | Cruson ..................... 460/112 |
| 5,569,081 | * | 10/1996 | Baumgarten et al. ........ 460/112 |
| 6,113,491 | * | 9/2000 | Holmén .................... 460/111 |

FOREIGN PATENT DOCUMENTS

| 0212270 | * | 3/1987 | (EP) ....................... 460/111 |
| 1239857 | | 11/1959 | (FR) . |
| 0241210 | * | 12/1925 | (GB) ....................... 460/112 |
| 2 165 732A | | 4/1986 | (GB) . |

* cited by examiner

Primary Examiner—Thomas B. Will
Assistant Examiner—Árpád Fábián Kovács

(57) ABSTRACT

A straw chopper with a housing having a chopping region and a discharge region, a chopping and conveying element and a distributor having several guide vanes for the transverse dispersal of the chopped straw, wherein the discharge region of the housing can be pivoted about a first axis relative to the chopping region of the housing and chopped straw is conducted by the conveying element past the chopping and the discharge regions in the direction toward the guide vanes. Choppers such as this are applied to harvesting machines such as combines, in order to distribute chopped straw on a field. In order to attain an optimum transverse distribution of the straw and to be able to bring the distributor into a favorable position for transport on the road, it is proposed that the distributor be arranged so as to be able to pivot relative to the chopping region of the housing, separately from the discharge region of the housing.

9 Claims, 3 Drawing Sheets

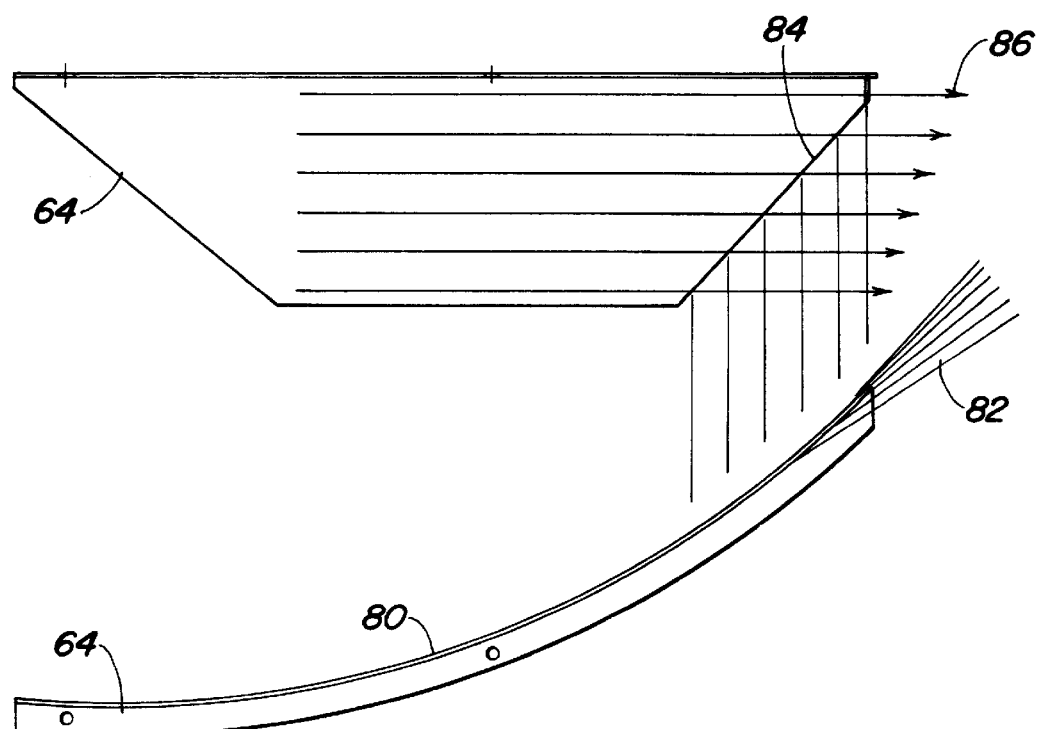

STRAW CHOPPER FOR A COMBINE

BACKGROUND OF THE INVENTION

1. Field of the Invention

The invention concerns a straw chopper and in particular a chopper having a housing that is provided with a chopping region and a discharge region, a chopping and conveying element arranged in the housing, and a distributor having several guide vanes for the transverse dispersal of the chopped straw. The discharge region of the housing can be pivoted about a first axis relative to the chopping region of the housing and the distributor can be separately pivoted about a second axis relative to the chopping region of the housing.

2. Description of Related Art

GB 2 165 732 A describes a chopper for a combine that has a rotationally driven chopper shaft with knives attached thereto and a housing enclosing the shaft and knives. The chopped straw is ejected through an ejection housing to which several guide vanes are fastened. The ejection housing is supported in bearings so as to pivot about the chopper shaft. The lower wall of the ejection housing forms at least a part of the bottom of the chopper housing in all pivotal positions of the ejection housing. In this way the ejection conditions should remain constant at all pivoted positions of the ejection housing. To enable the straw to be deposited in swaths for later collection, the chopper may be mounted to the combine to move forward relative to the combine body. This creates a large free space through which the straw can reliably fall to the ground from the combine. Mounting the chopper in this manner results in additional cost but has the advantage that when the chopper is moved forward, the ejection housing does not interfere with over-the-road transport of the combine with the header towed behind the combine. To avoid the added cost of a movable chopper, in most cases the chopper is rigidly connected to the combine. Upward pivoting of the ejection housing is required for over-the-road transport of the combine with the header towed behind the combine. However, sufficient upward pivoting of the ejection housing cannot be performed due to the position of the center of rotation of the ejection housing.

SUMMARY OF THE INVENTION

The chopper of the present invention includes a housing having a chopping region fixed to the combine and a discharge region that pivots relative to the chopping region. A distributor having guide vanes is also pivotally mounted to the housing for rotation relative to the chopping region of the housing separate from the discharge region. A chopping and conveying element is rotatable carried by the housing for chopping and conveying straw.

During operation of the chopper, straw is conducted through a slot between the chopping and conveying element and the chopping and discharge regions of the housing and is then ejected. The straw reaches the guide vanes that are provided in order to distribute the straw as evenly as possible in the sideways direction, that is, transverse to the direction of operation of the combine. The discharge region of the housing is pivotal to permit it to be positioned so that the crop is thrown onto the guide vanes as long as possible. The airflow produced by the chopping and conveying element is also guided optimally in the desired direction, that is, toward the guide vanes, and supports the ejection of the chopped straw. The discharge region of the housing extends, as a rule, over the entire width of the chopping and conveying element, as preferably also does the chopping region of the housing. By pivoting the discharge region of the housing, the direction of ejection of the chopped straw can be selected. In its operating position the distributor can be locked in various inclinations. The goal is to control the direction of ejection in the horizontal plane from the chopper with the discharge region of the housing in such a way that the chopped straw is directed optimally through the guide vanes with each inclination of the distributor.

The distributor is arranged to pivot in such a way that the guide vanes are located in a certain relationship in space relative to the discharge region of the housing. Normally the distributor is adjusted in its inclination with respect to the horizontal in order to control the width of dispersal. The discharge region of the housing then conforms to the inclination of the straw distributor. This provides the assurance that the guide vanes are contacted optimally by the chopped straw. The guide vanes consist of a multitude of sheet metal components arranged vertically and extending in the direction of the transport of the combine. As a rule the vanes are curved in the horizontal direction to disperse the straw over a wide area and may be configured so as to be adjustable or to be bent in their lateral position.

It is an advantage of the invention that the distributor can be pivoted independently of the housing discharge region and therefore can be pivoted upward or downward for transport over the road. Movement of the chopper between its operating position and its non-operating position is not required.

In a preferred embodiment, the distributor can be pivoted about a second axis that extends parallel to the first axis about which the housing discharge region is pivoted and is spaced at a distance from it. The second axis can connect the distributor with the discharge region of the housing, or alternatively, establish a connection between the distributor and the chopping region of the housing.

During the operation of the chopper, locking of the discharge region of the housing and the distributor is required. Although it would be conceivable to lock both aforementioned pivot axes separately by appropriate mechanical means, such as screws or cam clamps, it is preferred that the discharge region of the housing and the distributor be configured so that they can be connected to each other in a positive or a friction lock. If the distributor is supported in bearings, free to pivot with respect to the chopping region of the housing, then a single locking arrangement can determine both pivot angles, specifically that of the discharge region and that of the distributor. If on the other hand the distributor is supported in bearing, free to pivot about the discharge region, then locking of the distributor and the discharge region could be performed by a removable connection between the chopping region of the housing and the distributor. The connection could, in particular, be a detent connection, where several different detent positions can be provided that make available different ejection directions for the chopped straw.

In a preferred embodiment for uniform distribution of the chopped straw, the guide vanes are positioned with respect to the discharge region such that an imaginary extension of the lower edge of the guide vanes at least approaches the tangent to the path of movement of the chopped straw from the discharge region of the housing. Thereby, chopped straw ejected tangential to the conveying element reaches the lower edge of the guide vanes, while chopped straw that is ejected further from the edge, in the direction of rotation of the conveying element (that is usually driven as a rotating unit) is conveyed in the direction of the centerline of the guide vanes and reaches the guide vanes at a distance from the edge. In this way a loading of the entire guide vanes with chopped straw can be attained. Since various ejection directions are desirable, the aforementioned geometric condition is attained preferably in several detent positions between the discharge region of the housing and the guide vanes.

It is proposed that at the discharge region of the housing, a first detent element be provided that is arranged to engage a second complementary detent element connected to the guide vanes. Here it is preferred, that the discharge region (or the guide vanes) be provided with several detent elements with which, in each case, the other detent element can be selectively engaged, in order to attain different ejection directions. The detent elements are preferably provided at the side edge of the chopping region, but could also be attached centrally or at another location at it, in particular if the distributor arrangement is divided into two devices arranged alongside each other.

To engage the discharge region of the housing in a detent with the guide vanes, various possibilities are conceivable. For example, a chain could be used one end of which is connected to the guide vanes (or to the discharge region), and whose links can be hooked selectively to the discharge region (or the guide vanes). Hooks or cams of differing lengths could also be employed, or locked at differing positions. Another possibility is a rod with which one or more corresponding recesses can engage.

In case that various ejection directions are desired, it is proposed that the first detent element contain recesses that are located at various distances from the first and the second axes. The positions of the recesses are selected in such a way that the desired angles of the discharge region and the guide vanes are reached.

For manufacturing reasons and in order to attain an ejection cone opening in the direction of the guide vanes at the ejection region of the discharge region, it is furthermore proposed that the discharge region be provided with a generally straight surface, that is, with a flat and not a curved effective surface. In this case there is an advantage in positioning the second axis and the detent element in such a way that an imaginary extension of a lower edge of the guide vanes intersects the first axis, in order to attain an optimum transverse dispersal of the chopped straw. As an alternative, a curved discharge region could be conceivable that conforms approximately to the enveloping circle of the chopping and conveying element. The chopping and conveying element may be a chopper shaft with attached knives that interact with opposing shear bars.

Finally it is proposed that at least one of the guide vanes be curved and that the end of this guide vane facing away from the conveying element be inclined at an angle to the direction of flow of the chopped straw. In this way, a particle of the chopped straw that impacts the guide vane is deflected through an angle that depends on the position (height perpendicular to the direction of transport of the crop) and direction of flight (impact angle of the particle) upon the impact of the particle on the guide vane, since the particular particle is deflected by the inclination through an angle that depends on these parameters and leaves the guide vane at an earlier or later point in time. Therefore the chopped straw leaves the guide vanes over a range of dispersal angles. A part of the guide vanes or all of the guide vanes may be configured in this way.

BRIEF DESCRIPTION OF THE DRAWINGS

FIG. 3 is a plan view of a guide vane of the distributor.
FIG. 4 is a side view of the guide vane of FIG. 3.

DESCRIPTION OF THE PREFERRED EMBODIMENT

Figure 1:
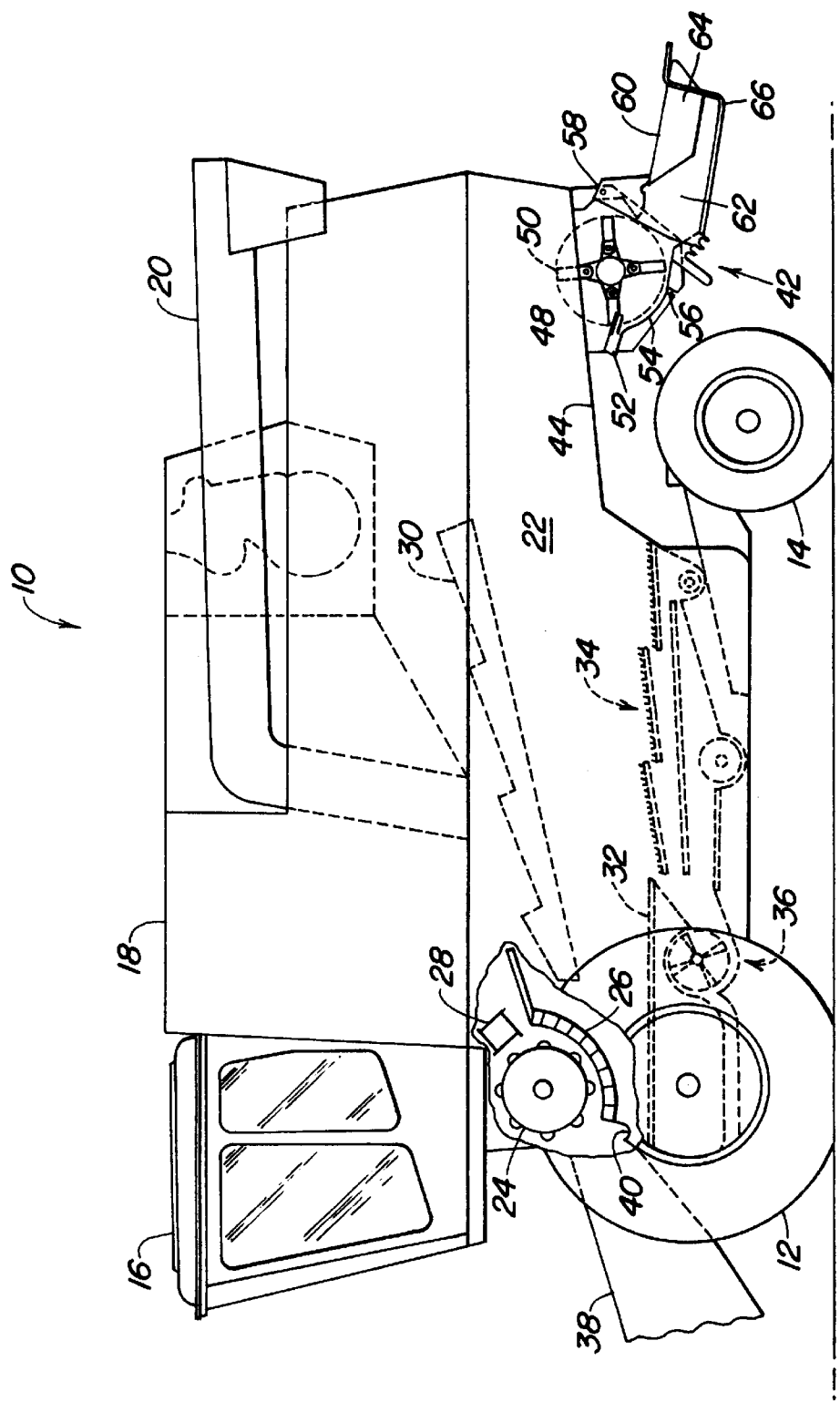
FIG. 1 is a side view of a combine having a chopper according to the present invention.

A harvesting machine, shown in FIG. 1, in the form of a combine 10 is supported on front and rear wheels 12 and 14. The combine 10 is provided with an operator's cab 16 from which an operator can control it. The operator's cab 16 is followed to the rear by a grain tank 18 that can deliver crop deposited in it through a discharge pipe 20 to the outside. The grain tank 18 is supported on a frame 22, in which crop conducted into it is threshed to remove grain from crop residue as the crop is moved in its path past a threshing cylinder 24, a threshing concave 26 and a beater 28. Straw walkers 30 following the beater 28, as well as a pan 32 and sieves 34, further separate the harvested crop, whereupon finally the threshed-out part of the crop, typically the clean grain, is conveyed into the grain tank 18. The crop residue, i.e. straw, is conveyed over the straw walkers 30 into a rear hood 44 of the combine 10 and lighter components are blown by a blower 36 from the sieves 34 onto the ground. The crop is harvested from the field by a header, not shown, at the front of the combine and is conveyed into the combine by a feederhouse 38, past a stone trap 40 and to the threshing cylinder 24. In place of the straw walkers 30, one or more rotating separator drums may be provided.

Figure 2:
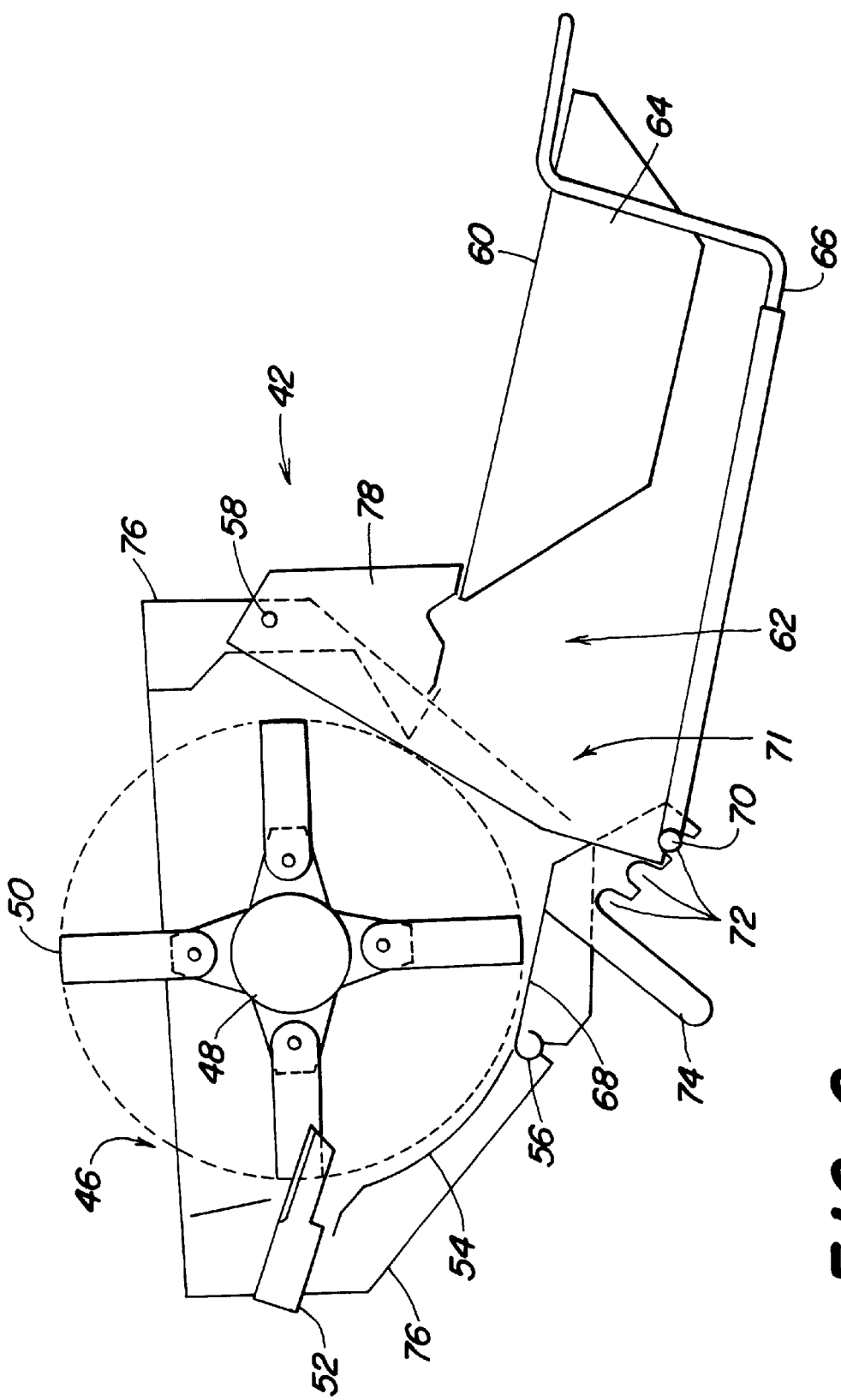
FIG. 2 is a enlarged side view of the chopper of FIG. 1.

At the rear end of the ejection hood 44, a chopper 42 is provided into which the components of the crop residue conveyed by the straw walkers 30, such as straw, are deposited due to the effect of gravity. The chopper 42 is shown in greater detail in FIG. 2 and includes a housing 76. A drum 48 rotating rapidly in counterclockwise direction in the housing 76 receives the straw. Several movable knives 50 are uniformly distributed over the circumference of the drum 48. The straw is carried along by the drum 48 and the knives 50 and drawn past a fixed rail with shear bars 52. The straw is chopped into short sections by the knives 50 and the shear bars 52. The drum 48 and the knives 50 operate as a chopping and conveying element. There are configurations of choppers in which, in place of the movable knives 50 on the drum 48 only fixed impeller plates are arranged. These impeller plates carry the straw through fixed shear bars. The teaching according to the present invention can also be applied to these configurations.

The chopped straw is conducted in a circular path through a narrow gap between the knives 50 and a chopping region 54 of the housing 76. The housing 76 is fastened to the underside of the ejection hood 44 and encloses the drum 48. The chopping region 54 of the housing 76 is therefore fastened in a stationary position to the combine 10 and forms an inlet 46 for receiving straw. Following this, the straw is conducted by the drum 48 past a discharge region 68 of the housing 76 that is pivoted in a joint from a first axis 56 that is orthogonal to the plane of the drawing. The chopping region 54 and the discharge region 68 form a so-called chopper chute, at whose end the straw leaves the circular path and is ejected to the rear through an outlet 71. The discharge region 68 of the housing 76 is a flat sheet metal component that extends over the entire effective width of the chopper 42. The largest amount of the straw leaves the circular path at the end of the discharge region 68 tangentially. A part, however, is further churned by the knives 50 and the ventilation resulting from their rotation. Hence a certain vertical dispersal of the straw occurs as the straw is ejected generally in the horizontal direction.

At the rear end of the chopper 42, a so-called distributor 62 is arranged. Through it the chopped straw should be distributed as uniformly as possible across the width of cut of the combine 10 transverse to the direction of operation. The distributor 62 is provided with a top sheet 60 pivoted about a horizontal axis 58 extending perpendicular to the plane of the drawing and designated as the second axis in the following. In this way the inclination of the entire distributor 62 can be controlled relative to the ground. Below the top sheet 60 a number of guide vanes 64 are arranged. The guide vanes 64 are elongated sheet metal components that extend vertically downward from the top sheet 60, and are provided with a curvature directed to the right or the left. In addition, the guide vanes 64 can be adjusted in their position transverse to the direction of operation of the combine 10. Due to their curvature and the orientation, the straw is deflected transverse to the direction of operation of the combine 10 when passing the guide vanes 64 and thereby distributed on the ground over a greater width than that corresponding to the width of the operating channel of the combine 10.

The chopped straw should be distributed as uniformly as possible over the entire cutting width of the combine 10. The uniform distribution is pre-condition for the requirement that no clogging of the operating machine takes place upon subsequent operations (tilling of the ground or direct sowing without tilling) and the quality of the ground remains constant over the entire width, that is, a uniform storage capability of moisture and a homogeneous decay process is attained. In today's combines the cutting width is substantially greater than the width of the operating channel (the cutter width may be over 9 m while the channel width may only be 1.6 m). Particularly critical is the distribution of very moist or green or heavy straw since the air resistance cannot swirl the straw as easily as dry straw which, after leaving the guide vanes 64, is braked by the air resistance and swirled about somewhat and therefore is deposited on the ground as a uniform layer. The moist or green straw leaves the guide vanes 64 in an undesirable manner and is thrown to the ground in bundles. Thereby visible stripes appear behind the combine 10 that can be attributed to the individual guide vanes 64.

To solve the aforementioned problem, a connection is proposed between the discharge region 68 of the housing 76 and the guide vanes 64 that are connected to the distributor 62. At its side end (or at both ends) of the discharge region 68 levers 74 are attached to the underside. In addition recesses 72 are provided at the underside of the discharge region 68 behind the levers 74 as seen in the direction of operation of the combine 10. The recesses 72 intrude comb like into the underside of the discharge region 68 and are each located at different distances from the first axis 56. The depth of the recesses 72 is also different for each recess in order to bring the inclination of the guide vanes 64 and the discharge region 68 into the desired relationship, as is further explained below. One of these recesses 72 in each case engages a transverse rod 70 that is connected to the distributor 62. The transverse rod 70 extends over the entire width of the distributor 62 and is connected with the top sheet 60 and the rigidly attached guide vanes 64 through rods 66 and two side plates 78 that are attached to the right and the left side of the distributor 62 (as seen in the direction of operation of the combine 10). The selection of the recess 72 establishes the inclination of the distributor 62. Simultaneously, the inclination of the discharge region 68 of the housing 76, and thereby the horizontal direction of ejection of the chopped straw, is made to comply with the inclination of the distributor.

In order to attain an optimum compliance of the direction of ejection at all possible operating positions of the distributor 62, the positions of the first axis 56, the second axis 58 and that of the recesses 72 are selected in such a way that the following criteria are met: The imaginary extension of the lower edge of the guide vanes 64 should touch tangentially the circular path of movement resulting from the guidance of the straw through the chopping region 54 and the discharge region 68 at all positions of the straw distributor 62. The first axis 56 is located in this region in which the imaginary extension touches the circular path tangentially. The first axis 56 is located immediately following the end of the chopping region 54, which is rigidly connected to the housing 76. The transition from the stationary chopping region 54 to the discharge region 68 occurs with a small step, so that the gap between both regions 54, 68 is located in the shadow of the path of movement of the straw. Therefore no straw can adhere to the gap. The recesses 72 are connected to the discharge region 68 in such a way that the discharge region 68 always directs the straw toward the guide vanes 64. In the ideal, case the discharge region 68 is directed parallel to the lower edge of the guide vanes 64.

The adjustment of the inclination of the distributor 62 is performed in the following manner: While the distributor 62 is retained in its use position, the lever 74 is moved in counterclockwise direction, so that the transverse rod 70 is disengaged from the particular recess 72 that it had occupied. Then the distributor 62 can be pivoted in such a way that the transverse rod reaches the vicinity of another (desired) recess 72, and the lever 74 can be pivoted in the clockwise direction, or it may simply be released so that it rotates in clockwise direction under the force of gravity. The locking of the transverse rod 70 in the recess 72 is also performed by the force of gravity, which generates a torque that attempts to rotate the distributor 62 in the clockwise direction, while it also rotates the discharge region 68 in this direction. As a result, the transverse rod 70 is forced against the bottom region of the particular recess 72 that it occupies and the discharge region 68 and the distributor 62 are locked with respect to each other and to the chopping region 54. In order to prevent an unintended release of the transverse rod 70 from its recess 72, particularly when operating on uneven ground, an additional locking of the discharge region 68 and/or the distributor 62 may be appropriate. This may be performed by a (wing) nut on one of the pins forming the second axis 58, and/or a removable cover (pivoted strap, plate, spring or the like) at the underside of the recesses 72, that prevent an escape of the transverse rod 70 from the particular recess 72 in which it is engaged. The additional locking must be released for a readjustment of the inclination of the distributor 62 and subsequently reapplied. As an alternative, or in addition, the lever 74 may be loaded by a spring in clockwise direction, in order to attain a reliable locking. If a spring forces the lever 74 in clockwise direction, it supports the force of gravity, and hence provides that the lever 74 can escape from the recess 72 only with difficulty. An extension spring underneath the discharge region 68 of the housing 76 or a torsion spring about the first axis 56 may be employed.

On the basis of the positioning of the second axis 58, the entire distributor 62 can be pivoted vertically upward in counterclockwise direction from the discharge region 68. As can be seen in FIG. 1, the distributor 62 can be pivoted vertically upward to the rear wall of the combine 10 (and locked there by means not shown in the drawing), so that it does not interfere, for example, during over the road transport of the combine, in particular when a towing vehicle for the header is attached to the rear of the combine.

The guide vanes 64 are provided with a curvature 80 that is illustrated in FIG. 3. The chopped straw is conducted corresponding to the curvature 80 in a circular path. At the end of the guide vanes 64 the straw leaves the circular path tangentially and is thrown upon the field deflected to one side with respect to the direction of operation of the combine 10. In the embodiment shown, the end of the guide vane 64, that can be seen in FIG. 4, extends inclined at an angle of approximately 45° with respect to the direction of flow of the straw indicated by arrows 86. Thereby the straw that is guided in the upper portion of the guide vanes 64 is further guided (that is longer) in the circular path than the straw in the lower portion of the guide vane. Since the straw leaves the circular path in the lower portion earlier than in the upper portion, it is not deflected as far to the side. In this way the straw leaves the guide vanes 64 without loss of energy across a certain angle of dispersal 82, and not as a bundled radius. The effect described is attained particularly well if the chopped straw is conducted through the guide vanes 64 as close as possible to the transverse direction to the curvature.

The invention should not be limited to the above-described embodiment, but should be limited solely by the claims that follow.

I claim:

1. A straw chopper for a combine comprising:
   a housing (76) having a chopping region (54) with a concave inside surface and a discharge region (68) pivotally mounted to the housing (76) adjacent the chopping region (54) of the housing, about a first axis (56), for rotation relative to the chopping region (54) of the housing (76);
   a chopping and conveying element (48, 50) rotatably arranged in the housing for chopping and conveying straw through the chopping region (54) and discharge region (68) in the direction toward an outlet (71)
   a distributor (62) having several guide vanes (64) adjacent the outlet for the transverse dispersal of the straw, the distributor (62) being pivotally mounted to the housing (76) about a second axis (58) for rotation relative to the housing; and
   a locking arrangement (70, 72) to connect the distributor (62) to the discharge region (68) to hold the discharge region (68) and the distributor (62) in place about the first and second axes (56, 58) respectively in operating positions.

2. The straw chopper as defined by claim 1 wherein the locking arrangement connects the discharge region and distributor in a detent connection in such a way that in several detent positions of the distributor, an imaginary extension of a lower edge of the guide vane extends, at least approximately, tangentially to a flow path of the straw which results from the chopping and conveying element interacting with the discharge region of the housing.

3. The straw chopper as defined by claim 1 wherein at a side edge of the discharge region a first detent element is attached that is arranged to accept a complementary second detent element connected to the guide vanes.

4. The straw chopper as defined by claim 3 wherein the discharge region of the housing is provided with several first detent elements with which the second detent element can be selectively engaged.

5. The straw chopper as defined by claim 3 wherein the first detent element contains multiple recesses that are located at differing distances from the first axis and the second axis.

6. The straw chopper as defined by claim 3 wherein the discharge region is generally straight and that the second axis and the detent elements are positioned in such a way that an imaginary extension of a lower edge of the guide vanes intersects the first axis.

7. The straw chopper as defined by claim 1 wherein the chopping and conveying element comprises a drum with knives fastened thereto that interact with shear bars.

8. The straw chopper as defined by claim 1 wherein at least one of the guide vanes is curved transversely and that the end of this guide vane facing away from the chopping and conveying element is inclined with respect to the direction of flow of the chopped straw.

9. A straw chopper for a combine comprising:
   a housing having an inlet for receiving straw and an outlet for discharging chopped straw therefrom;
   a chopping and conveying element arranged in the housing for chopping and conveying straw through the housing; and
   a distributor having several guide vanes for the transverse dispersal of the chopped straw, at least one of the guide vanes is curved transversely and the end of this guide vane facing away from the chopping and conveying element is inclined with respect to the direction of flow of the chopped straw;
   wherein the housing includes a chopping region and a discharge region pivotally mounted to the chopping region and wherein the distributor is pivotally mounted to the housing for rotation independently of the rotation of the discharge region and further comprising a locking to connect the distributor to the discharge region to hold the discharge region and the distributor in place in operating positions.

* * * * *